Oct. 1, 1935.  F. C. AREY ET AL  2,016,262
UNION BETWEEN CONDUITS OR OTHER MEMBERS
Filed Nov. 1, 1933
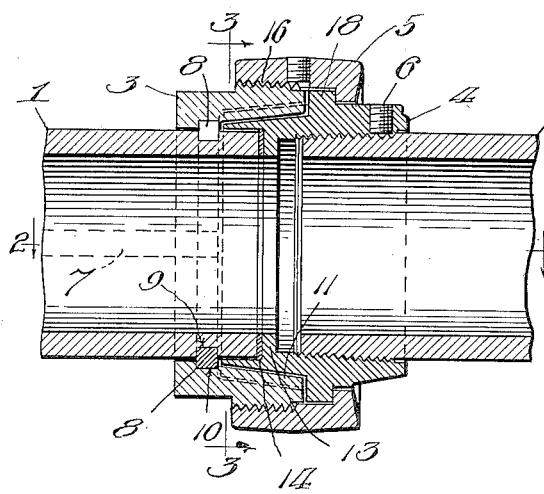
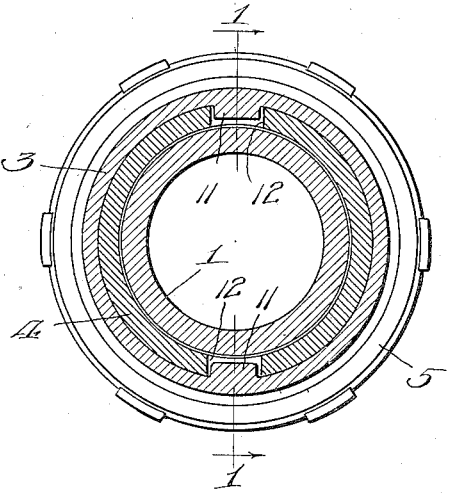
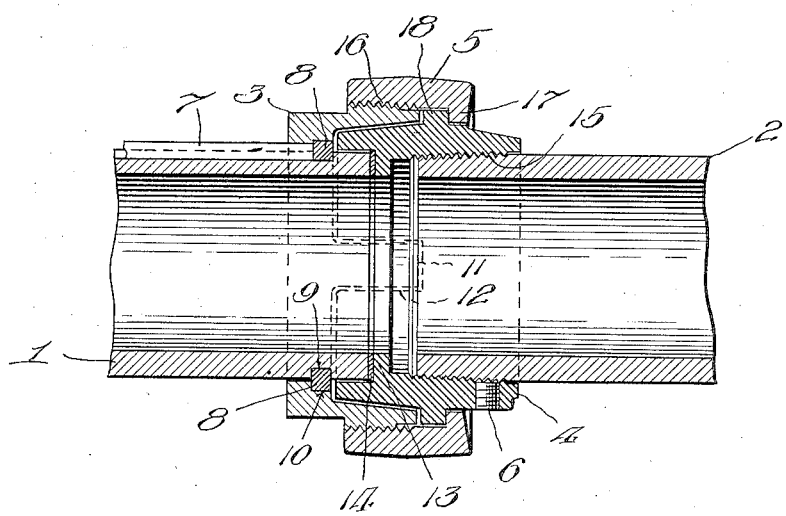
Inventor;
Fred C. Arey & DeLos E. Filmer Jr.
by Wm F Freudenreich
Atty.

Patented Oct. 1, 1935

2,016,262

UNITED STATES PATENT OFFICE 2,016,262

UNION BETWEEN CONDUITS OR OTHER MEMBERS

Fred C. Arey, Oak Park, Ill., and De Los E. Hibner, Jr., Du Bois, Pa., assignors to Vulcan Soot Blower Corporation, a corporation of Pennsylvania Application November 1, 1933, Serial No. 696,176

6 Claims. (Cl. 285—120)

In modern soot blowing systems for boilers it is common practice to employ tubular blower or cleaning elements that extend outwardly through the boiler setting to a source of supply of steam; the steam being delivered through a head provided with a rotatable conduit portion adapted to be attached to and make a steam-tight joint with the tubular blower or cleaner element. The object of the present invention is to provide a novel and improved means for coupling together such a tubular blower element and the conduit member in the corresponding head.

Since the blower element and the supply conduit connected thereto are both tubes or conduits, the present invention may be regarded as having for its object to produce a novel and improved joint or union between conduits.

The various features of novelty whereby our invention is characterized will hereinafter be pointed out with particularity in the claims; but, for a full understanding of the invention and of its objects and advantages, reference may be had to the following detailed description taken in connection with the accompanying drawing, wherein:

Figure 1 is a longitudinal section through the meeting ends of two conduits and connecting means between the same embodying the present invention, the section being on line 1—1 of Fig. 3; Fig. 2 is a section on line 2—2 of Fig. 1; and Fig. 3 is a section on line 3—3 of Figure 1.

Referring to the drawing, 1 represents a conduit carried by and adapted to deliver steam or other fluid under pressure from a soot blower head, not shown. Axially aligned with the member 1 is a tubular blower element 2. Surrounding and fixed to the member 1 is a sleeve 3 and, surrounding and fixed to the member 2, is a sleeve 4. Each sleeve projects beyond the end of the member that carries it, the projecting ends being telescoped upon each other. Surrounding both of the sleeves, and screwed upon one of them and interlocked with the other so as to draw the two sleeves together when the nut is tightened, is a nut 5.

In the arrangement shown, one of the sleeves is keyed to its supporting tube so as to be held against relative rotary movement with respect thereto and against withdrawal from the tube in the direction of the length of the latter, whereas the other sleeve is screwed upon its supporting conduit. Since the member 1 is the driving member, as well as the member which has the greater permanency because the member 2 is subjected to the heat of the furnace, the sleeve 3 is keyed to the member 1 and the sleeve 4 is screwed upon the member 2; suitable set screws 6 serving to prevent unscrewing. Rotation of the sleeve 4 on the member 1 is prevented by a suitable key 7, while a retaining ring 8, seated in an annular groove 9 in the member 1 and extending into an annular internal groove 10 in the sleeve 3, prevents this sleeve from being drawn off the end of the member 1. The retaining ring 8 is set back from the extreme end of the tube or conduit 1 so that the extreme end portion of the sleeve 4 surrounds the end of the tube or conduit 1. That part of the sleeve 3 which surrounds the sleeve 4 is provided with two longitudinal ribs 11 which are entered in recesses 12 in the periphery of the sleeve 4. Consequently, the two sleeves are interlocked against relative turning movements and the driving effort is delivered from the sleeve 3 through the sleeve 4 to the blower element independently of the nut 5.

The nut 5 is, of course, necessary to hold the parts against relative endwise movement and to effect a sealed joint which will prevent the escape of steam or other cleaning fluid. It will be seen that the sleeve 4 is provided with an internal flange 13 at some distance from its free end. Between this flange and the edge face of the tube or conduit 1 is located a suitable gasket 14. Upon drawing the sleeves together, in the lengthwise direction, the gasket is compressed between the flange 13 and the end of the tube or conduit 1, so that leakage at this point is prevented. The screw-threaded joint 15 between the members 2 and 4 being steam-tight, it will be seen that there is no opportunity given the steam to go elsewhere from the tube or conduit 1 than into and through the blower element. The sleeve 4 and the member 1 are drawn together in the direction of the length of the latter by the nut 5 which, at one end, is screwed upon the sleeve 3, as indicated at 16, and, at the other end, is provided with an inwardly-extending annular flange 17 that engages with the rear side of an annular external shoulder 18 on the sleeve 4. The parts are so proportioned that the end of the sleeve 3 does not come in contact with the shoulder 18, nor is there any other firm seating of any part of either sleeve against the other, to prevent effective pressure from being applied to the gasket.

It will thus be seen that we have produced a simple and novel fluid-tight coupling between two conduits; the coupling being boltless but including means which, while screwed upon one of the members, is positively interlocked with the other member against relative rotation. Consequently, the sleeve nut or the like, that holds the parts of the coupling together, is entirely relieved of any duty with respect to the transmission of turning forces, and there is no tendency to tighten or unscrew the nut when one of the conduits is rotated and drives the other.

While we have illustrated and described with particularity only a single preferred form of our invention, we do not desire to be limited to the exact structural details thus illustrated and described; but intend to cover all forms and arrangements which come within the definitions of the invention constituting the appended claims.

We claim:

1. In combination, two tubular members arranged end to end, sleeves upon the meeting ends of said members, an interlock between said sleeves to prevent relative turning movements between the same, one of the sleeves having an internal flange positioned between said members, a gasket between said flange and the end face of the member on which the second sleeve is mounted, the joint between said second sleeve and the tubular member on which it is mounted being more or less open, a sleeve nut screwed upon one of the sleeves and extending beyond the latter and around the other sleeve, and cooperating shoulders on the said latter sleeve and the nut to cause the gasket to be compressed and the sleeves to be held against separation in the lengthwise direction when the nut is tightened.

2. In combination, two tubular members arranged end to end, sleeves upon the meeting ends of said members and interengaged with the same to permit the sleeves to hold them against separation in the lengthwise direction, an interlock between said sleeves to prevent relative turning movements between the same, one of the sleeves having an internal flange positioned between said members, a gasket between said flange and the end face of the member on which the second sleeve is mounted, the joint between said second sleeve and the tubular member on which it is mounted being more or less open, a sleeve nut screwed upon one of the sleeves and extending beyond the latter and around the other sleeve, and cooperating shoulders on the said latter sleeve and the nut to cause the gasket to be compressed and the sleeves to be drawn toward each other when the nut is tightened.

3. In combination, two tubular members arranged end to end and spaced a short distance apart, a sleeve screwed upon one of said members and having an external shoulder between the ends thereof, a second sleeve keyed upon the other member against relative rotary and endwise movements, the first sleeve having an internal annular flange positioned between the adjacent ends of said members, a gasket between the aforesaid flange and the end face of the member on which the second sleeve is mounted, cooperating elements on the sleeves engaging with each other and preventing relative rotary movements, and a sleeve nut surrounding the shouldered part of the first sleeve and screwed upon the end of the second sleeve, said nut having a flange engaged with the shoulder on the first sleeve so as to cause the said gasket to be clamped between the said internal flange and the tubular member between which it lies.

4. In combination, two members arranged end to end, a sleeve screwed upon one of said members and having an external shoulder between the ends thereof, a sleeve keyed upon the other member against relative rotary and endwise movements and having a part surrounding the adjacent end of the other sleeve, cooperating elements on the sleeves engaging with each other and preventing relative rotary movements, and a sleeve nut surrounding the shouldered part of the first sleeve and screwed upon the end of the second sleeve, said nut having a flange engaged with the shoulder on the side facing away from the second sleeve.

5. In combination, a driving conduit and a driven conduit arranged end to end, sleeves carried by said conduits at said ends, cooperating shoulders on said sleeves holding them against relative rotary movements while permitting relative lengthwise movements, one of the sleeves having an internal flange positioned between the adjacent ends of said conduits, a gasket between said flange and the end face of the conduit on which the second sleeve is mounted, the joint between said second sleeve and the conduit on which it is mounted being more or less open and means cooperating with said sleeves to draw them together in the lengthwise direction and compress the gasket.

6. In combination, a driving conduit and a driven conduit arranged end to end in spaced relation to each other, a sleeve screwed on the end of the driven conduit and having an internal annular shoulder positioned in the face between the conduits, a second sleeve on and interlocked with the driving conduit so as to be held against relative rotary movements with respect thereto and against lengthwise movements beyond a predetermined point in the direction of the driven conduit, cooperating shoulders on said sleeves holding them against relative rotary movements while permitting relative lengthwise movements, a gasket between said internal flange and the end face of the driving conduit, and a coupling member associated with said sleeves to draw them together in the lengthwise direction and cause the gasket to be compressed between the said internal flange and the end of the driving conduit.

FRED C. AREY.
DE LOS E. HIBNER, Jr.